United States Patent [19]
Fruitman et al.

[11] Patent Number: 5,631,419
[45] Date of Patent: May 20, 1997

[54] GAUGE ASSEMBLY

[75] Inventors: Lev A. Fruitman, Southfield; Dale E. Thorsby, Riverview, both of Mich.

[73] Assignee: Ford Motor Company, Dearborn, Mich.

[21] Appl. No.: 588,674

[22] Filed: Jan. 17, 1996

[51] Int. Cl.$^6$ .................................................. G01L 19/14
[52] U.S. Cl. ................................................ 73/431; 277/56
[58] Field of Search .................................. 73/431, 866.1, 73/866.3; 116/284–296, 305; 277/56, 57

[56] References Cited

U.S. PATENT DOCUMENTS

| | | |
|---|---|---|
| 2,779,442 | 1/1957 | Bacon . |
| 3,530,724 | 9/1970 | Hartland et al. .......................... 73/431 |
| 4,021,016 | 5/1977 | Hart . |
| 4,214,486 | 7/1980 | Gorgens et al. . |
| 4,328,639 | 5/1982 | Cotey . |
| 5,237,871 | 8/1993 | Henderson et al. . |

FOREIGN PATENT DOCUMENTS 519061  2/1931  Germany ................................. 277/57

OTHER PUBLICATIONS

Dragerwerk, Sheet 1 only of UK 105,060.

*Primary Examiner*—Robert Raevis
*Attorney, Agent, or Firm*—Neil P. Ferraro; Lynn M. DaDamio

[57] ABSTRACT

A gauge assembly for a vehicle instrument cluster is provided. The gauge assembly includes a pointer assembly and a plastic housing having a pair of housing elements. One of the housing elements includes a receptacle which defines a side wall having a first circumferentially extending mating surface, while the other housing element includes a plug which defines a side wall having a second circumferentially extending mating surface. Upon assembly of the housing, the plug and receptacle together define a chamber therebetween. The pointer assembly includes a magnet rotatably disposed within the chamber, a pointer body positioned outside of the housing, and a shaft rotatably extending along an axis of rotation defined through one of the housing elements. The shaft couples the pointer body to the magnet for rotative movement about the axis of rotation. The gauge assembly further includes a viscous damping fluid carried in the chamber for damping the rotational movement of the magnet. To prevent fluid leakage from the chamber, the second mating surface is received in sealing engagement with the first mating surface and forms a labyrinthian seal therebetween.

6 Claims, 2 Drawing Sheets

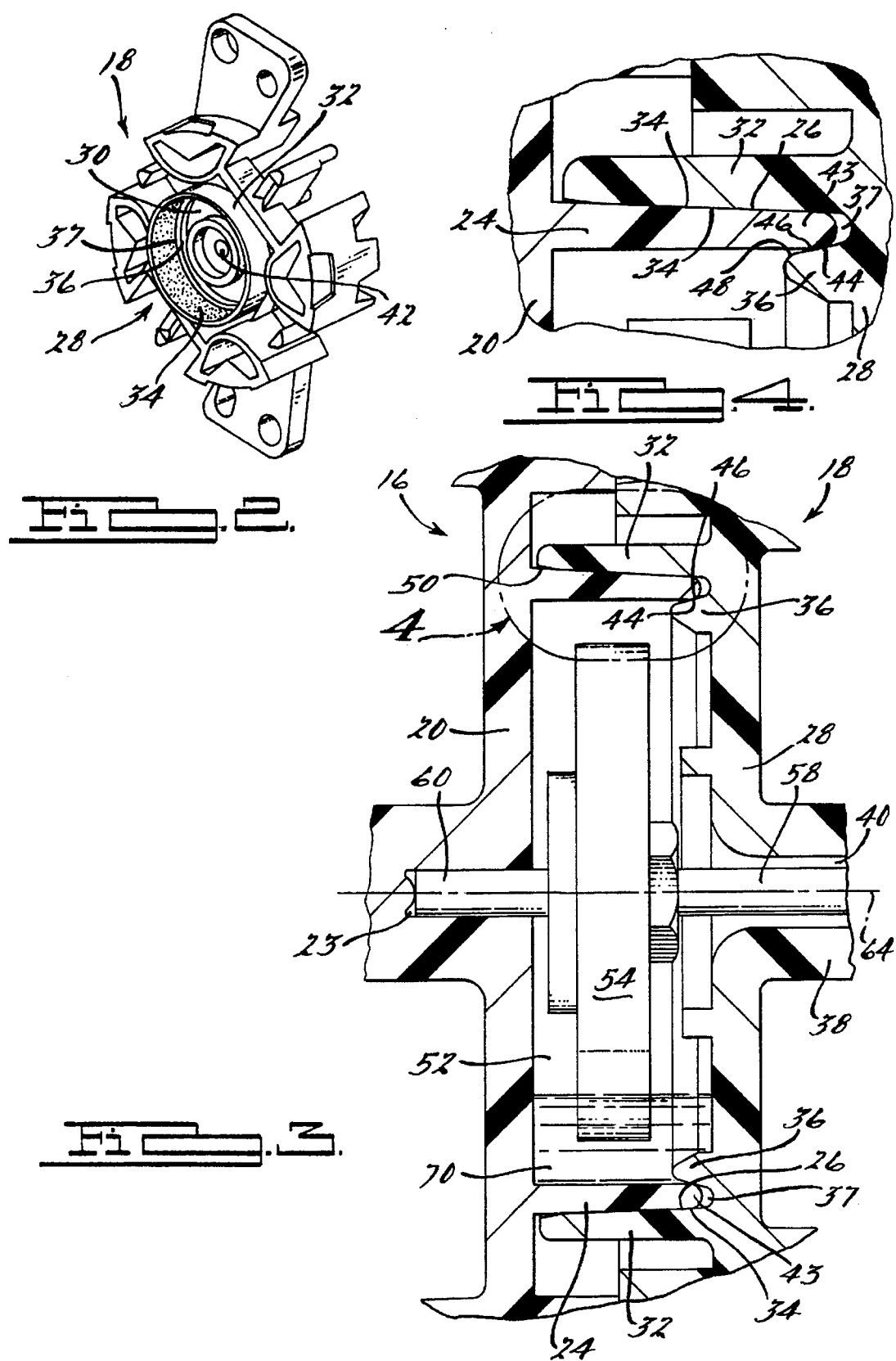

GAUGE ASSEMBLY

BACKGROUND OF THE INVENTION

1. Field of the Invention

The present invention relates to a gauge assembly for use in a vehicle instrument cluster.

2. Description of Related Art

Instrument cluster gauges, such as the speedometers, tachometers, fuel and temperature gauges used in modern vehicles, commonly include a pointer body or needle coupled to a permanent magnet. The magnet is generally carried in a plastic housing or bobbin, which is wrapped with wire coils. During operation of the vehicle, current flowing through the coils creates a magnetic field, and the magnet rotates within the housing to align itself in force balanced relationship with the field. Since the pointer body rotates with the magnet, positioning of the pointer body is controlled by the direction and magnitude of the current in the coils. To provide for steady movement of the pointer body, a viscous fluid is carried in the housing to damp the rotational movement of the magnet.

Gauge housings commonly comprise a pair of interlocking housing elements, which together define a chamber for holding the magnet and damping fluid. It is known, for example, to provide one of the housing elements with a receptacle and the other housing element with a plug which fits within the receptacle and forms a chamber therebetween. Typically, the receptacle includes a side wall having a first circumferentially extending mating surface while the plug includes a side wall having a second circumferentially extending mating surface. As is conventional in the fluid handling arts, the mating surfaces each have a generally smooth surface texture. Ideally, the two mating surfaces are joined in a press fit, fluid-tight relationship. In practice, however, the connection is often insufficient to prevent leakage of damping fluid from the chamber. A need therefore exists for a gauge assembly having improved seal means capable of reliably retaining damping fluid within the housing chamber.

SUMMARY OF THE INVENTION

The present invention provides a gauge assembly for a vehicle instrument cluster having the abovedescribed fluid retaining capability. The gauge assembly comprises a plastic housing having first and second housing elements, which together include means defining a chamber. The gauge assembly also comprises a pointer assembly that includes a magnet rotatably disposed within the chamber, a pointer body positioned outside of the housing, and a shaft rotatably extending along an axis of rotation defined through one of the housing elements. The shaft couples the pointer body to the magnet for rotative movement about the axis of rotation. The gauge assembly further comprises a viscous damping fluid carried in the chamber for damping the rotational movement of the magnet. In accordance with the present invention, the means defining a chamber includes a receptacle defined within one housing element and a plug defined within the other housing element. The receptacle defines a side wall having a first circumferentially extending mating surface while the plug defines a side wall having a second circumferentially extending mating surface. To prevent fluid leakage from the chamber, the second mating surface is received in sealing engagement with the first mating surface and forms a labyrinthian seal therebetween.

According to one aspect of the present invention, the labryinthian seal is defined by a rough finish provided on at least one of the mating surfaces.

Advantageously, the labyrinthian seal between the mating surfaces of the two housing elements ensures that there is no direct, axial leakage path between the inside and the outside of the chamber along the plug-receptacle interface. Moreover, the rough finish provided on one or more of the mating surfaces increases the compliance of the respective side walls so that a tighter press-fit may be obtained without excessively loading the components. The roughness of the interface also helps to prevent the plug and receptacle from working apart over time.

These and other features and advantages of the present invention will be more fully described below with reference to the following detailed description and drawings.

BRIEF DESCRIPTION OF THE DRAWINGS

FIG. 2 is a perspective view of one of the housing elements of the gauge assembly having a receptacle provided thereon.

FIG. 3 is a partial sectional view of an instrument cluster gauge assembly according to the present invention.

FIG. 4 is an enlarged view of the area labelled 4 in FIG. 3, showing an alternative embodiment of the present invention.

DETAILED DESCRIPTION OF PREFERRED EMBODIMENTS

Figure 1:
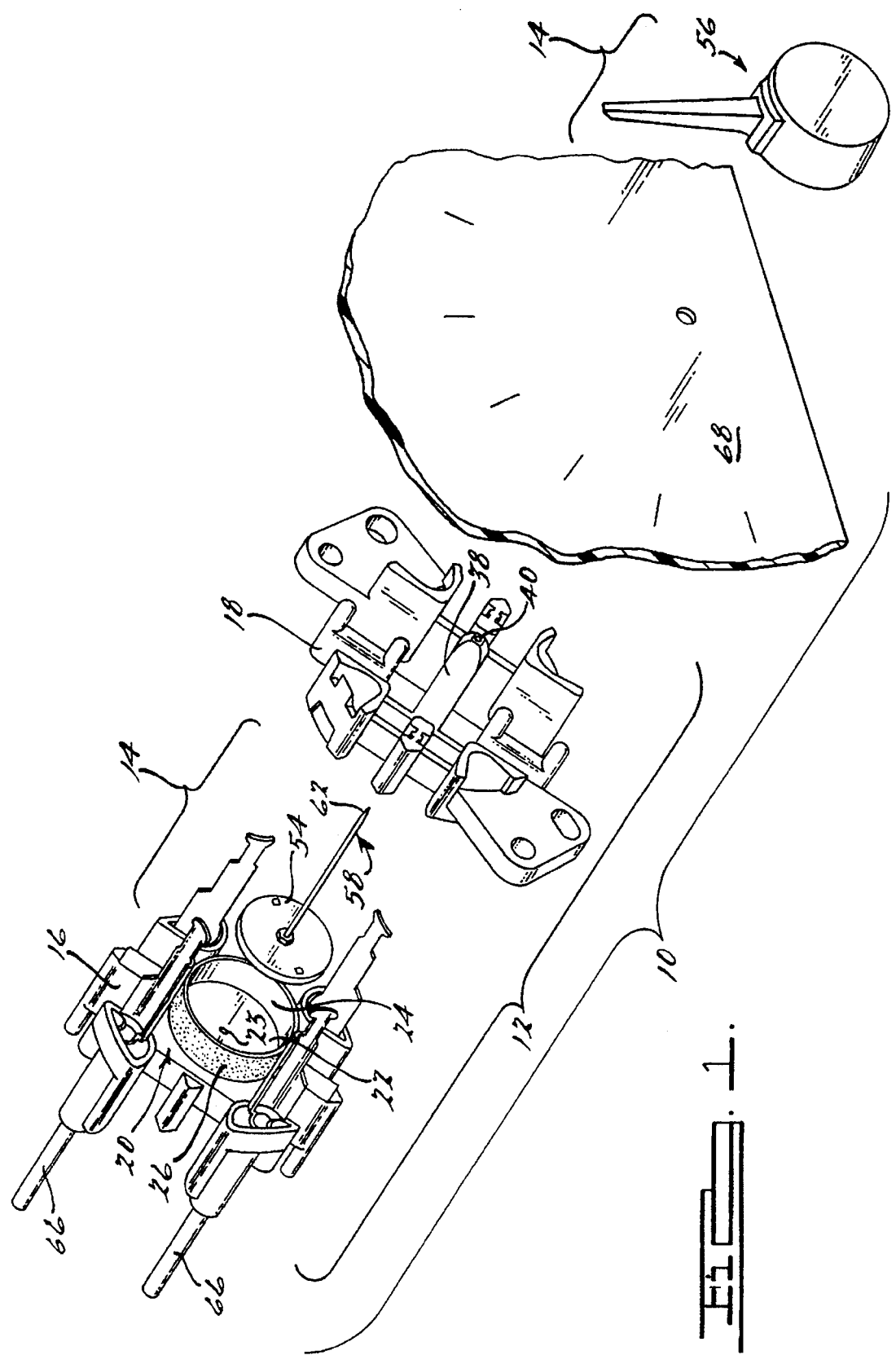
FIG. 1 is an exploded perspective view of an instrument cluster gauge assembly according to the present invention.

Turning now to the drawings, and in particular to FIG. 1 thereof, a gauge assembly 10 is illustrated as comprising a plastic housing 12 and a pointer assembly 14. Housing 12 is preferably made up of a pair of interlocking housing elements 16, 18. As depicted in FIG. 1, housing element 16 defines a generally cup-shaped plug 20. Plug 20 includes a generally planar end wall 22 having a blind opening 23 positioned generally centrally therein. Plug 20 also includes a generally cylindrical side wall 24. The outer surface of side wall 24 defines a circumferentially extending mating surface 26. Mating surface 26 preferably has a rough finish, as shown in FIG. 1. Various known surface roughening techniques, such as sandblasting, may be used to provide the desired finish. Alternatively, the rough finish may be formed on mating surface 26 during the molding of housing element 16. The rough finish preferably has an irregular pattern comprising random indentations and protrusions. Various stippling patterns are suitable for use with the present invention. One preferred stippled finish, having a pattern depth of about 0.0004 inch, is available from Rawal Engravers of Villa Park, Ill., under the designation MT-11000. Other patterns are, of course, possible and will be readily apparent to those skilled in the art in view of this disclosure.

Turning next to FIG. 2, housing element 18 is illustrated as comprising a generally cup-shaped receptacle 28. Receptacle 28 includes an end wall 30 and a generally cylindrical side wall 32. The inner surface of side wall 32 defines a circumferentially extending mating surface 34. Mating surface 34 preferably has a rough finish, such as that described above with respect to mating surface 26. End wall 30 preferably includes a rib 36 which is spaced radially from side wall 32 and defines a channel 37 therebetween. Rib 36 has a length less than the length of side wall 32. Housing element 18 further comprises a nose portion 38 (see FIG. 1), having a bore 40 extending therethrough. As illustrated in FIG. 2, one end of bore 40 comprises an opening 42 in end wall 30.

Housing 12 is assembled from housing elements 16, 18 as shown in FIGS. 3 and 4. Plug 20 and receptacle 28 are sized such that an interference fit is established between mating surfaces 26 and 34 when plug 20 is inserted into receptacle 28. Due to the overlapping arrangement and the roughness of mating surfaces 26, 34, a labyrinthian seal is formed therebetween. Plug 20 is preferably also sized such that an end portion 43 of side wall 24 is received in the channel 37 formed between rib 36 and side wall 32. A surface 44 of plug 20 preferably seals against a surface 46 of rib 36. According to the preferred embodiments of the present invention, rib 36 is provided with an outwardly extending chamfered surface 48 for facilitating insertion of plug 20 into the receptacle. Similarly, a lead chamfer is preferably provided on side wall 32 of receptacle 28, at a location indicated generally by reference numeral 50. Because the outer surface of receptacle side wall 32 is free to flex radially outward, as shown in FIGS. 3 and 4, and because end portion 43 of plug side wall 24 fits into channel 37, plug side wall 24 is restricted from radially inward flexing movement thereby providing a tight sealing force. Upon assembly of housing 12 in the manner described above, a fluid-tight chamber 52 is formed between plug 20 and receptacle 28 of housing elements 16 and 18, respectively.

As may be seen in FIGS. 1 and 3, pointer assembly 14 includes a disc-like magnet 54 disposed within chamber 52. Pointer assembly 14 also includes a pointer body 56 and a shaft 58. Shaft 58 is secured to magnet 54 in conventional fashion and rotatably supports magnet 54 within chamber 52. One end 60 of shaft 58 is seated within opening 23 in housing element 16. The other end 62 of shaft 58 extends through bore 40 in nose portion 38 of housing element 18. End 62 is secured to pointer body 56 in conventional fashion outside of housing element 18. As illustrated in FIG. 3, opening 23 and bore 40 define an axis of rotation 64 about which shaft 58, magnet 54 and pointer body 56 are free to rotate.

In a preferred embodiment of the present invention, gauge assembly 10 is an automotive cross-coil type gauge having two generally orthogonal sets of wires (not shown) wrapped in conventional fashion around housing elements 16, 18. The wires are electrically connected through terminals 66 (FIG. 1) to a sensor (not shown). During operation of the vehicle, current flows from the sensor through the wires, creating a magnetic field. Magnet 54 responds to the magnetic field by rotating about axis of rotation 64 into force balanced alignment with the field. Pointer body 56, which is coupled to magnet 54 by shaft 58, rotates along with magnet 54 and displays the relevant sensor information on face plate 68. To ensure steady movement of pointer body 56, a viscous fluid 70, such as silicone, is carried within chamber 52 for damping the rotational movement of magnet 54. Damping fluid 70 is retained within chamber 52 by the labyrinthian seal formed between mating surfaces 26, 34.

While the invention has been shown and described in its preferred embodiments, it will be clear to those skilled in the arts to which it pertains that many changes and modifications may be made thereto without departing from the scope of the invention. For example, while both mating surfaces 26, 34 have been illustrated and described as having a rough finish, the benefits of the present invention are also achieved in some embodiments when only one mating surface is provided with a rough finish. Such modifications which fall within the true scope of this invention are intended to be included within the terms of the appended claims.

What is claimed is:

1. An instrument cluster gauge assembly, comprising:

a plastic housing having first and second housing elements, said first and second housing elements together including means defining a chamber;

a pointer assembly including a magnet rotatably disposed within said chamber, a pointer body positioned outside of said housing, and a shaft rotatably extending along an axis of rotation defined through one of said housing elements, said shaft coupling said pointer body to said magnet for rotative movement about said axis of rotation; and a viscous damping fluid carried in said chamber for damping the rotational movement of said magnet;

said means defining a chamber including:
      a receptacle defining:
         a generally cylindrical receptacle side wall having an unrestricted circumferentially extending outer surface such that said receptacle side wall is free to flex radially outward and an inner surface;
         a circumferentially extending receptacle mating surface on said inner surface; and
         an end wall having a rib projecting therefrom and extending substantially in the same direction as said receptacle side wall and having a length substantially less than said receptacle side wall, said rib being spaced radially inward from said receptacle side wall to define a channel therebetween; and,
      a plug defining:
         a generally cylindrical plug side wall having an outer surface;
         a circumferentially extending plug mating surface on said outer surface; and,
         an end portion being received in said channel in sealing engagement therein;

said receptacle being placed in an interference overlapping sealing engagement with said plug and forming a labyrinthian seal between said plug mating surface and said receptacle mating surface, with said end portion of said plug side wall substantially restricting said plug side wall from radially inward movement resulting from said flexing of said receptacle side wall when said receptacle and said plug are placed in said interference overlapping sealing engagement.

2. An instrument cluster gauge assembly according to claim 1, wherein at least one of said receptacle and plug mating surfaces has a rough finish.

3. An instrument cluster gauge assembly according to claim 2, wherein said at least one mating surface has a stippled finish.

4. An instrument cluster gauge assembly according to claim 2, wherein each of said receptacle and plug mating surfaces has a rough finish.

5. An instrument cluster gauge assembly according to claim 4, wherein each of said receptacle and plug mating surfaces has a stippled finish.

6. An instrument cluster gauge assembly according to claim 1, wherein the one of said housing elements having said receptacle positioned thereon is the same housing element through which said shaft extends.

\* \* \* \* \*